Patented Jan. 20, 1942

2,270,386

UNITED STATES PATENT OFFICE 2,270,386

ALIPHATIC HYDROCARBON AMMONIUM CHROMATE

Clifford K. Sloan, Wilmington, Del., assignor to E. I. du Pont de Nemours & Company, Wilmington, Del., a corporation of Delaware No Drawing. Application May 13, 1939, Serial No. 273,579

9 Claims. (Cl. 260—438)

This invention relates to the chromates derived from aliphatic amines, including straight chained, branched chained, and cycloaliphatic amines.

Very few organic chromates have been prepared that can be isolated. The chromic acid esters of the lower aliphatic alcohols are unstable and cannot be obtained in pure form. Certain esters of the more complex alcohols have been prepared such as tricyclohexylmethyl carbinol chromate and diphenylpentadecyl carbinol chromate. It is thus apparent that from such a limited knowledge of organic chromates no generalization can be made with regard to the possibility of obtaining and isolating other organic chromates.

It is an object of this invention to prepare aliphatic hydrocarbon ammonium chromates that are oil-soluble and have a high degree of water repellency.

These objects are accomplished by reacting chromic acid or an acid chromate with an aliphatic or cycloaliphatic amine, or by reacting a water-soluble acid or neutral metallic chromate with a salt of an aliphatic or cycloaliphatic amine, thereby producing a substituted ammonium chromate. It is preferable that the reaction be carried out at moderate or low temperatures to avoid excess oxidation of the organic component by the chromic acid component. The aliphatic ammonium chromates having an alkyl group of carbon chain length of at least 6 carbon atoms are particularly effective as anticorrodents. The acid chromates falling within this class are especially effective in preventing the corrosion of metal surfaces upon which they have been applied.

The following examples in which parts are given by weight illustrate the methods of preparation for a few typical products. They are not, however, to be considered as limitations of the invention since many modifications may be made without departing from the spirit and the scope of said invention.

Example 1

Two hundred forty parts of dodecylamine are dispersed in 3000 parts of ice water and stirred into a solution of 130 parts of $CrO_3$ dissolved in 1000 parts of ice water. The reaction is complete in a short time and the precipitate formed is filtered off with suction. The product is then re-slurried and filtered three times, using 3000 parts of ice water each time. Partial drying is effected by drawing air through the product on the filter following final filtration, after which the material is spread out and allowed to dry in the air at a temperature not above 15° C.

Yields of better than 90% are obtained by this method.

Example 2

Three hundred seventy parts of "Lorol" amine are dispersed in 2000 parts of water and stirred into a solution of 200 parts of $CrO_3$ in 1000 parts of water. Efficient agitation at this stage assists in the formation of a granular product. The precipitate is filtered and washed with water by suction, care being taken to prevent removal of all water as this promotes coalescense of the waxy particles.

The filter cake is washed twice with methanol by decantation and finally on a suction filter, after which it is partially dried by drawing air through the product for two or three minutes. The product is then reslurried in ether and filtered; this is repeated three times and after the final filtration the material is dried in air at room temperature.

Yields of 75% or more can be obtained by this method, and the final product is a dry, powdery material which is stable for months when stored at room temperature away from direct sunlight.

"Lorol" is the trade name for a mixture of normal primary monohydric alcohols obtained by the hydrogenation of coconut oil fatty acids. "Lorol" amine is a mixture of the corresponding amines.

Example 3

One hundred fourteen parts of dicyclohexylamine are suspended in 1000 parts of water and stirred into a solution of 63 parts of $CrO_3$ in 500 parts of water. This mixture is agitated vigorously until a finely divided, solid product is formed which is then filtered, washed with water and dried at room temperature.

Example 4

One hundred parts of octadecylamine are added to 1000 parts of hot water and the molten amine then dispersed with agitation. To this dispersion is added a solution of 18.6 parts of $CrO_3$ in 500 parts of cold water, and the whole is stirred vigorously to insure formation of a finely divided precipitate. The product obtained is filtered, washed with water and dried at room temperature.

Example 5

Three and one-half parts of didodecylamine and one part of $CrO_3$ are dissolved separately in 70 parts of acetone, the solutions are mixed thoroughly, and then added with stirring to 1400 parts of water. The precipitate formed is filtered, washed with water and dried at room temperature.

Example 6

Ten parts of "Stenol" amine are suspended in 100 parts of water and added with vigorous agitation to a solution of 3.7 parts of $CrO_3$ in 50 parts of water. The precipitate is removed and dried as described above.

"Stenol" is the trade name for a mixture of alcohols obtained by the catalytic reduction of sperm oil. "Stenol" amine is a mixture of the corresponding amines.

Example 7

Ten parts of dicyclohexylamine are added to 100 parts of water and then stirred into a solution of 2.76 parts of $CrO_3$ in 50 parts of water. The neutral chromate precipitates out and is removed and dried as described in Example 3.

The products coming within the scope of this invention are the acid chromates and the neutral chromates derived from aliphatic (and cycloaliphatic) amines. The amines may be either primary, secondary, or tertiary and may be either mono-, di-, tri-, or polyamines. Quaternary ammonium chromates are also included. Examples of compounds falling within the scope of this invention are the following:

Diethylammonium chromate
Butylammonium chromate
Butylammonium acid chromate
Dibutylammonium chromate
Dibutylammonium acid chromate
Tributylammonium chromate
Tributylammonium acid chromate
Hexylammonium chromate
Octylammonium chromate
2-ethylhexyl ammonium chromate
Hexamethylene diammonium chromate
Decamethylene diammonium chromate
Dodecylammonium acid chromate
Didodecylammonium chromate
Tridodecylammonium chromate
Tetradecylammonium acid chromate
Octadecylammonium acid chromate
Cyclohexylammonium chromate
Dicyclohexylammonium chromate
Methylcyclohexylammonium chromate
Hexadecylphenylammonium chromate
Dodecylpyridinium acid chromate
Octadecyltriethylammonium acid chromate
Dodecyltrimethylammonium chromate It is evident from the foregoing that these compounds may be defined as having the following structural formula:

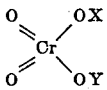

where X is selected from the group consisting of H, $NH_3R$, $NH_2RR'$, $NHRR'R''$ and $NRR'R''R'''$ and Y is selected from the group consisting of $NH_3R$, $NH_2RR'$, $NHRR'R''$ and $NRR'R''R'''$ wherein R is an aliphatic (including cycloaliphatic) radical and may be the same or different, and R', R'', and R''' are either aliphatic or aromatic radicals. Of these, the alkyl ammonium chromates containing an alkyl group containing at least 6 carbon atoms in a straight chain are the most important because of their water-repellent properties when used as corrosion inhibitors (or anticorrodents) for the surface coating of iron. For this use the acid chromates are preferred, and those in which the alkyl group containing 6–24 carbon atoms in the straight chain, and especially 8–18 carbon atoms, are the most useful.

The reaction for the preparation of these compounds, as has been pointed out, should be carried out at a relatively low temperature although satisfactory products can be obtained at room temperatures and in certain cases at temperatures as high as 60° C. The low temperature not only prevents the oxidation of the amine by the chromic acid or its equivalent but also aids in the production of a more granular product, thus giving a product that is easier to handle than products obtained at higher temperatures. The reaction temperature should be not more than 20° C. above the melting point of the particular alkylamine being processed in the preferred method for preparing alkylammonium chromates.

In place of chromic acid as a reactant as shown in the examples, soluble normal or acid chromates may be used. Examples of such salts are sodium, potassium and ammonium chromates either in the form of a normal or acid salts. When using chromates in place of chromic acid, the amine should be in the form of a salt such as the hydrochloride in order to facilitate the displacement reaction.

As shown in Examples 2 and 6, amines may be used that are in fact mixtures of amines or mixed amines, these amines being obtained by the reaction of ammonia with alcohols obtained by the catalytic hydrogenation of coconut oil acids or sperm oil. The technical mixtures of alcohols obtained are known as "Lorol" and "Stenol" alcohols depending on whether they are obtained from coconut oil acids or sperm oil.

The compounds of this invention are particularly well adapted to the protection of ferrous metal articles, such as bolts, nuts, nails, wire, sheets, tools, fine machinery parts, bearings, cutlery, gears, fire arms, metallic cases, etc., and to the treatment of ferrous metal articles which have been provided with a surface coating of some other metal or alloy, such as chromium, copper, nickel, cadmium, zinc, brass, aluminum, tin, lead, etc. In addition to such uses, these compounds may be applied to the surfaces of other metals and alloys, particularly those used for structural shapes and articles of commerce, for example, as sheets, rods, tubes, and the like. Among such metals are zinc, brass, bronze, aluminum, tin, copper, pewter, lead, magnesium, cadmium, "duralumin," nickel, etc.

The compounds of this invention are also particularly useful in coating compositions as a substitute for the usual acid acceptors. As compared with most inorganic acid acceptors they have the advantage of not undergoing undesirable side reactions with an oleoresinous binder when such is used in the coating. They are also useful as anticorrodents for metals in view of their water-repellent characteristics. In respect to this use the acid chromates have an advantage over the neutral chromates.

Although these compounds will usually be applied to metal surfaces by means of a solution using such well known processes as dipping, spraying, wiping, and brushing, it will be desirable at times to use other methods of application. A material which melts at reasonably low temperatures and which undergoes no decomposition in the region of its melting point may be applied in the liquid form without a diluent of any kind, provided that the application of the material is so regulated that the final protective film conforms to the desired thickness limits. These compounds may also be applied to the metal surface as a finely divided solid and the protective layer be formed by fusing the solid particles to a continuous coating at a suitable temperature. The protective agent may also be emulsified or dispersed in a liquid which is not a true solvent and applied to metal surfaces in this form, with the evaporation of the carrier occurring subsequently. In some instances it has been found that oils of various types may serve as carriers for the protective agent, and in such cases it is not intended that the carrier be removed by evaporation as is the practice when solvents or dispersions are used. Besides keeping the surface of the metal bright and free from rust these compounds have been found useful for promoting adherence to the metal of a subsequently applied paint film.

Other uses of the compounds of this invention are based on the combined water repellency and fungicidal properties of the compounds, and include the rot-proofing of canvas tarpaulins, belting, and various fiber products such as ropes and mats. In this case the water resistance and insolubility secured through the long aliphatic carbon chain greatly increases the life of the treatment under conditions of out-of-door use.

I claim:

1. An ammonium chromate in which one of the valences of the pentavalent nitrogen is satisfied by an aliphatic hydrocarbon radical and the remaining valences are satisfied by a radical selected from the group consisting of hydrogen and hydrocarbon radicals.

2. A saturated aliphatic hydrocarbon ammonium chromate.

3. A saturated aliphatic hydrocarbon ammonium acid chromate.

4. An alkyl ammonium acid chromate having an alkyl group of chain length of from 6 to 24 carbon atoms.

5. An alkyl ammonium acid chromate having an alkyl group of chain length of from 8 to 18 carbon atoms.

6. A mono alkyl ammonium acid chromate wherein the alkyl group is of a chain length of from 8 to 18 carbon atoms.

7. Dicyclohexyl ammonium acid chromate.

8. The ammonium acid chromate of the mixture of normal primary aliphatic amines having alkyl chains of the same carbon content and structure and mixed in the same proportion as the long chain aliphatic acids in coconut oil fatty acids.

9. The ammonium acid chromate of the mixture of normal primary aliphatic amines having alkyl chains of the same carbon content and structure and mixed in the same proportion as the long aliphatic carbon chains in the acid portion of sperm oil.

CLIFFORD K. SLOAN.